United States Patent
Xiao et al.

(10) Patent No.: US 9,461,866 B2
(45) Date of Patent: Oct. 4, 2016

(54) METHOD, APPARATUS AND SYSTEM FOR SENDING PHYSICAL LAYER SIGNAL

(71) Applicants: Huawei Technologies Co., Ltd., Shenzhen (CN); Tsinghua University, Beijing (CN)

(72) Inventors: Zhenyu Xiao, Beijing (CN); Changming Zhang, Beijing (CN); Pei Liu, Beijing (CN)

(73) Assignees: Huawei Technologies Co., Ltd., Shenzhen (CN); Tsinghua University, Beijing (CN)

( * ) Notice: Subject to any disclaimer, the term of this patent is extended or adjusted under 35 U.S.C. 154(b) by 73 days.

(21) Appl. No.: 14/563,799

(22) Filed: Dec. 8, 2014

(65) Prior Publication Data

US 2015/0092724 A1 Apr. 2, 2015

Related U.S. Application Data

(63) Continuation of application No. PCT/CN2013/075510, filed on May 10, 2013.

(30) Foreign Application Priority Data

Jun. 7, 2012 (CN) .......................... 2012 1 0185973

(51) Int. Cl.
*H04L 27/38* (2006.01)
*H04L 27/26* (2006.01)
(Continued)

(52) U.S. Cl.
CPC ....... *H04L 27/3863* (2013.01); *H04L 27/2602* (2013.01); *H04L 43/04* (2013.01); *H04W 72/0446* (2013.01); *H04W 72/0453* (2013.01)

(58) Field of Classification Search
CPC ........... H04L 27/3863; H04L 27/2602; H04L 43/04; H04W 72/0446; H04W 72/0453
See application file for complete search history.

(56) References Cited

U.S. PATENT DOCUMENTS 7,085,330 B1 * 8/2006 Shirali .................. H03F 1/3247
375/296

(Continued)

FOREIGN PATENT DOCUMENTS

CN     101690294 A     3/2010
CN     101997803 A     3/2011

(Continued)

OTHER PUBLICATIONS

Kwon et al., "Preamble Structure for Single Frequency Cellular Systems Using Orthogonal Frequency Division Multiplexing," IEEE Transactions on Consumer Electronics, vol. 50, No. 1, pp. 115-118, Institute of Electrical and Electronics Engineers, New York, New York (Feb. 2004).

(Continued)

*Primary Examiner* — Ajay Cattungal
(74) *Attorney, Agent, or Firm* — Leydig, Voit & Mayer, Ltd.

(57) ABSTRACT

Embodiments of the present invention disclose a method, an apparatus and a system for sending a physical layer signal, where the method for sending a physical layer signal includes: constructing a signal frame of a physical layer signal, where the signal frame includes one single-frequency sequence, the single-frequency sequence is used to enable a receiving apparatus to capture the signal frame in a frequency domain according to the single-frequency sequence, and the single-frequency sequence includes a plurality of single-frequency preset symbols; and sending the physical layer signal based on the signal frame. Applying the present invention can facilitate capturing the signal frame in a frequency domain by a receive end, and therefore, not only impact caused by frequency offset is overcome, but also multipath energy may be used effectively to improve performance of capturing.

20 Claims, 2 Drawing Sheets

(51) Int. Cl.
  *H04L 12/26* (2006.01)
  *H04W 72/04* (2009.01)

(56) References Cited

U.S. PATENT DOCUMENTS

| | | | | |
|---|---|---|---|---|
| 7,362,821 | B1* | 4/2008 | Shirali | H03F 1/3247 |
| | | | | 375/285 |
| 7,418,038 | B2* | 8/2008 | Kikuchi | H04B 3/30 |
| | | | | 375/257 |
| 2003/0156624 | A1 | 8/2003 | Koslar | |
| 2003/0160662 | A1* | 8/2003 | Chang | H01P 5/02 |
| | | | | 333/33 |
| 2004/0190649 | A1* | 9/2004 | Endres | H04L 7/0278 |
| | | | | 375/326 |
| 2005/0105165 | A1* | 5/2005 | Emori | H01S 3/06754 |
| | | | | 359/334 |
| 2006/0274320 | A1* | 12/2006 | Caplan | G02B 6/2726 |
| | | | | 356/491 |
| 2007/0171994 | A1* | 7/2007 | Parker | H04L 1/08 |
| | | | | 375/260 |
| 2008/0002652 | A1* | 1/2008 | Gupta | H01Q 1/2291 |
| | | | | 370/338 |
| 2008/0089282 | A1 | 4/2008 | Malladi et al. | |
| 2008/0225761 | A1* | 9/2008 | Zhang | H04W 16/14 |
| | | | | 370/310 |
| 2008/0240711 | A1* | 10/2008 | Liu | H04B 10/0793 |
| | | | | 398/9 |
| 2009/0190633 | A1* | 7/2009 | Smith | H04B 1/123 |
| | | | | 375/148 |
| 2010/0094602 | A1 | 4/2010 | Boschma et al. | |
| 2012/0287878 | A1* | 11/2012 | Moon | H04L 5/001 |
| | | | | 370/329 |
| 2013/0028597 | A1* | 1/2013 | Ye | H04B 10/07953 |
| | | | | 398/26 |
| 2013/0064193 | A1* | 3/2013 | Moon | H04L 5/001 |
| | | | | 370/329 |
| 2013/0163525 | A1* | 6/2013 | Moon | H04W 72/042 |
| | | | | 370/329 |
| 2013/0223301 | A1* | 8/2013 | Lee | H04L 5/0055 |
| | | | | 370/281 |

FOREIGN PATENT DOCUMENTS

| | | |
|---|---|---|
| CN | 102227098 A | 10/2011 |
| CN | 102468952 A | 5/2012 |
| CN | 102769509 A | 11/2012 |
| RU | 2433556 C2 | 11/2011 |
| RU | 2448414 C2 | 4/2012 |
| WO | WO 2008052026 A2 | 5/2008 |
| WO | 2012013218 A1 | 2/2012 |

OTHER PUBLICATIONS

Zhu et al., "On the Performance of IEEE 802.15.3c Millimeter-Wave WPANs: PHY and MAC," 2010 6$^{th}$ Conference on Wireless Advanced (WiAD), Institute of Electrical and Electronics Engineers, New York, New York (Jun. 27-29, 2010).

Luo et al., "Throughput Maximization of a Hybrid Dynamic Frame Aggregation and Block-ACK Scheme for 60 GHz High Speed Communications," 2010 IEEE 21$^{st}$ International Symposium on Personal Indoor and Mobile Radio Communications, pp. 1248-1253, Institute of Electrical and Electronics Engineers, New York, New York (Sep. 26-30, 2010).

Cordeiro et al., "IEEE 802.11ad: Introduction and Performance Evaluation of the First Multi-Gbps WiFi Technology," Proceedings of the 2010 ADM International Workshop on mmWave Communications: from Circuits to Networks, pp. 3-7, Association for Computing Machinery, New York, New York (Sep. 24, 2010).

"OFDM Symbol System Based on 802.11a Improved Synchronization Algorithms," OFDM System Synchronization Technology, Chapter 5, Chongqing University Master's Thesis, Chongqing, China (May 18, 2007).

"Draft Standard for Information Technology-Telecommunications and Information Exchange Between Systems—Local and Metropolitan Area Networks—Specific Requirements—Part 11: Wireless Lan Medium Access Control (MAC) and Physical Layer (PHY) Specifications—Amendment 3: Enhancements for Very High Throughput in the 60 GHz Band," IEEE P802.11ad/D7.0, pp. 1-661, Institute of Electrical and Electronics Engineers, New York, New York (Apr. 2012).

"IEEE Standard for Information Technology-Telecommunications and Information Exchange Between Systems-Local and Metropolitan Area Networks-Specific Requirements; Part 15.3: Wireless Medium Access Control (MAC) and Physical Layer (PHY) Specifications for High Rate Wireless Personal Area Networks (WPANs); Amendment 2: Millimeter-Wave-Based Alternative Physical Layer Extension," IEEE Std. 802.15.3c-2009, Institute of Electrical and Electronics Engineers, New York, New York (Oct. 12, 2009).

"High Rate 60 GHz PHY, MAC and PALs," Standard ECMA-387, 2$^{nd}$ Edition, ECMA Iternational, pp. i-288, Geneva, Switzerland (Dec. 2010).

* cited by examiner

METHOD, APPARATUS AND SYSTEM FOR SENDING PHYSICAL LAYER SIGNAL

CROSS-REFERENCE TO RELATED APPLICATIONS

This application is a continuation of International Patent Application No. PCT/CN2013/075510, filed on May 10, 2013, which claims priority to Chinese Patent Application No. 201210185973.8, filed on Jun. 7, 2012, all of which are hereby incorporated by reference in their entireties.

TECHNICAL FIELD

The present invention relates to the communications field, and in particular, to a method, an apparatus and a system for sending a physical layer signal.

BACKGROUND

60 GHz millimeter wave communications is an emerging short-distance high-speed radio communications technology that is defined on a 60 GHz band. Because countries over the world have up to several GHz unlicensed spectrums near the 60 GHz band, the 60 GHz millimeter wave technology has enormous communication capacity. With a WPAN (wireless personal area network) defined by using the 60 GHz millimeter wave technology, it can be convenient to implement high-speed interconnection between mobile devices and wireless display of mobile devices on a large-sized television set, display or projector. In addition, ultra high-speed download and synchronization can be implemented in hotspot areas, and Gbps (billions of bits per second, indicating a capability level of network switching bandwidth) Internet access is available, which enhances users' Internet experience. Therefore, it is attracting wide attention over the world. By now, two 60 GHz standards, ECMA 387 (European Computer Manufacturers Association) and IEEE 802.15.3c (Institute of Electrical and Electronics Engineers, American Institute of Electrical and Electronics Engineers), have been released, and another standard IEEE 802.11 ad is under formulation.

Figure 1:
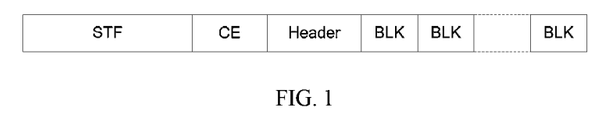
FIG. 1 is a schematic diagram of a typical frame structure of a WPAN physical layer signal defined in a 60 GHz millimetric wave standard in the prior art.
Figure 2:
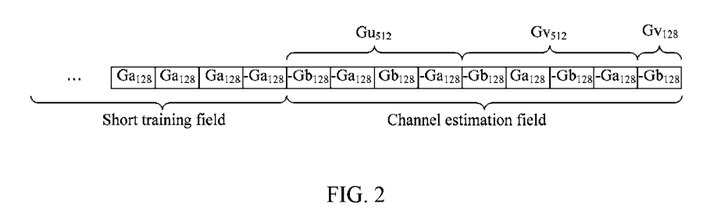
FIG. 2 is a schematic diagram of a composition structure of an STF and a CE in the typical signal frame shown in FIG. 1.

All existing 60 GHz millimeter wave standards have defined a method for sending a WPAN physical layer signal, and a typical frame structure of the method is shown in FIG. 1. In the frame structure, an STF (short training field) is a short training sequence part, and CE (channel estimation) is an auxiliary sequence used for channel estimation. The STF is formed of sixteen Ga128 sequences and one –Ga128 sequence, and the CE is also formed of ±Ga128 and ±Gb128, as shown in FIG. 2. Both Ga128 and Gb128 are Golay sequences that are 128 in length. During sending of a physical layer signal based on this frame structure, a receive end may use the STF to perform burst frame capturing, frequency offset estimation and compensation, phase offset estimation and compensation, timing error estimation and compensation, and the like; use the CE to perform channel estimation; and then restore information of a frame header (Header) and a data block (BLK).

Impact of a non-ideal radio frequency factor is not taken into full consideration in the technical solution of the existing method for sending a physical layer signal. For a 60 GHz millimeter wave signal, due to a high frequency and large bandwidth, there is inevitably impact of a non-ideal factor on a radio frequency component. Typically, there are nonlinear impact and impact of IQ (inphase, inphase component; quadrature, quadrature component) imbalance, which are generated in a power amplification process, on the radio frequency component. Although some blind estimation-based solutions are available for the nonlinear impact and the IQ imbalance that are generated in a power amplification process, for a 60 GHz system, a receiver is too complex and lacks feasibility. In addition, in the $Ga_{128}$-based frame capturing, multipath energy cannot be used to improve robustness of capturing, and, due to too large carrier frequency offset of the 60 GHz system, the capturing can only be performed by using a differential coherence method. A related detector produces relatively good detection performance in an ideal channel. However, under impact of channel multipath, the performance of the detector significantly deteriorates. In addition, although a multiple correlation method can resist carrier phase offset, rotation phases are different under impact of large frequency offset, and a correlation value is relatively greatly affected, which affects performance of capturing.

SUMMARY

The embodiments of the present invention provide a method, an apparatus and a system for sending a physical layer signal, so as to capture a physical layer signal frame by using a simple capturing method and improve performance of capturing.

An embodiment of the present invention provides a method for sending a physical layer signal, where the method for sending a physical layer signal includes:

constructing a signal frame of a physical layer signal, where the signal frame includes one single-frequency sequence, the single-frequency sequence is used to enable a receiving apparatus to capture the signal frame in a frequency domain according to the single-frequency sequence, and the single-frequency sequence includes a plurality of single-frequency preset symbols; and sending the signal frame at a physical layer.

Correspondingly, an embodiment of the present invention further provides a method for receiving a physical layer signal, where the method for receiving a physical layer signal includes:

receiving a signal frame of a physical layer signal; and capturing, if the received signal frame of the physical layer signal includes one single-frequency sequence, the signal frame in a frequency domain according to the single-frequency sequence, where the single-frequency sequence includes a plurality of single-frequency preset symbols.

Correspondingly, an embodiment of the present invention further provides an apparatus for sending a physical layer signal, where the apparatus for sending a physical layer signal includes:

a signal frame constructing module, configured to construct a signal frame of a physical layer signal, where the signal frame includes one single-frequency sequence, the single-frequency sequence is used to enable a receiving apparatus to capture the signal frame in a frequency domain according to the single-frequency sequence, and the single-frequency sequence includes a plurality of single-frequency preset symbols; and a sending module, configured to send the signal frame at a physical layer.

Correspondingly, an embodiment of the present invention further provides an apparatus for receiving a physical layer signal, where the apparatus for receiving a physical layer signal includes:

a receiving module, configured to receive a signal frame of a physical layer signal; and a frequency domain frame capturing module, configured to capture, if the signal frame of the physical layer signal that is received by the receiving module includes one single-frequency sequence, the signal frame in a frequency domain according to the single-frequency sequence, where the single-frequency sequence includes a plurality of single-frequency preset symbols.

Correspondingly, an embodiment of the present invention further provides a system for transmitting a physical layer signal, which includes the apparatus for sending a physical layer signal and the apparatus for receiving a physical layer signal that are described above.

Implementation of the embodiments of the present invention brings the following beneficial effects: constructing a signal frame that includes one single-frequency sequence can facilitate capturing the signal frame in a frequency domain by a receive end, and therefore, not only impact caused by frequency offset is overcome, but also multipath energy may be used effectively to improve performance of capturing.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are only a part rather than all of the embodiments of the present invention. All other embodiments obtained by a person of ordinary skill in the art based on the embodiments of the present invention without creative efforts shall fall within the protection scope of the present invention.

Figure 3:
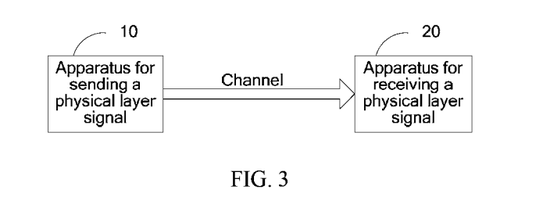
FIG. 3 is a schematic diagram of a composition structure of a system for transmitting a physical layer signal according to an embodiment of the present invention.

FIG. 3 is a schematic diagram of a composition structure of a system for transmitting a physical layer signal according to an embodiment of the present invention. As shown in FIG. 3, the system for transmitting a physical layer signal that is put forward in the present invention includes an apparatus 10 for sending a physical layer signal and an apparatus 20 for receiving a physical layer signal, where:

the apparatus 10 for sending a physical layer signal is configured to construct a signal frame of a physical layer signal, where the signal frame includes one single-frequency sequence, the single-frequency sequence is used to enable a receiving apparatus to capture the signal frame in a frequency domain according to the single-frequency sequence, and the single-frequency sequence includes a plurality of single-frequency preset symbols, and send the signal frame at the physical layer.

The apparatus 20 for receiving a physical layer signal is configured to receive the signal frame of the physical layer signal, and, when the received signal frame of the physical layer signal includes one single-frequency sequence, capture the signal frame in a frequency domain according to the single-frequency sequence.

Figure 4:
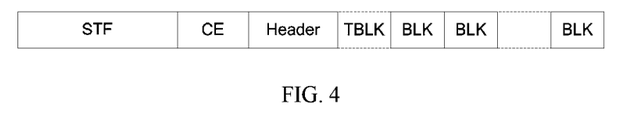
FIG. 4 is a schematic diagram of a signal frame according to an embodiment of the present invention.
Figure 6:
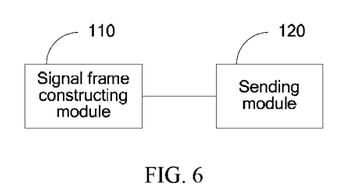
FIG. 6 is a schematic diagram of a composition structure of an apparatus for sending a physical layer signal according to an embodiment of the present invention.

FIG. 6 is a schematic diagram of a composition structure of an apparatus for sending a physical layer signal according to an embodiment of the present invention. As shown in FIG. 6, the apparatus for sending a physical layer signal in this embodiment includes:

a signal frame constructing module 110, configured to construct a signal frame of a physical layer signal, where the signal frame includes one single-frequency sequence, the single-frequency sequence is used to enable a receiving apparatus to capture the signal frame in a frequency domain, that is, perform frequency domain frame capturing, according to the single-frequency sequence, and the single-frequency sequence includes a plurality of single-frequency preset symbols. Specifically, the signal frame of the physical layer signal in this embodiment may be shown in FIG. 4, where a BLK (block) is a data block, which is data content that actually needs to be sent for communication. A difference from the structure of the typical frame mentioned in the BACKGROUND is: (1) STFs for performing estimation and compensation for the signal frame in the time domain and the frequency domain are different, and, for details, refer to FIG. 5, the STF in this embodiment is formed of one single-frequency sequence $SFS_M$ that is M in length, N $Ga_{128}$ sequences and one $-Ga_{128}$ sequence, where the $SFS_M$ sequence is $e^{jn\pi/2}$, n=1, 2, . . . , M. Generally, M is an integer multiple of 128. The single-frequency sequence $SFS_M$ may be used to capture a frequency domain frame and estimate an IQ imbalance parameter. The N $Ga_{128}$ sequences are used for frequency offset estimation and compensation, phase offset estimation and compensation, timing error estimation and compensation, and the subsequent one $-Ga_{128}$ sequence is used for frame delimitation. Generally, the $SFS_M$ needs to be located before the BLK in the signal frame. As shown in FIG. 4, the $SFS_M$ in this embodiment is located in the first part, the STF, in the signal frame. In this way, the receiving apparatus can perform IQ imbalance estimation and compensation immediately after the frequency domain frame is captured successfully, and the subsequent auxiliary sequence and a valid data part can be compensated.

The training data block TBLK has a same structure as the BLK, and the structure is GI+DATA (GI, guard interval), except that DATA in the TBLK is a preset known symbol and is used to estimate a distorted constellation after balancing. It should be emphasized that the TBLK is an optional field, and whether it appears is defined by a specific field in the Header in the signal frame. That is because, for some lower-order modulation such as BPSK (binary phase shift keying) and QPSK (quadrature phase shift keying), nonlinear impact generated in a power amplification process is relatively little, and optionally, the distorted constellation may be estimated without training, so as to improve efficiency; for some higher-order modulation such as 16QAM (quadrature amplitude modulation) and 64QAM, however, the nonlinear impact generated in the power amplification process is relatively severe, and therefore, a TBLK is generally required, so that the receiving apparatus can estimate the distorted constellation diagram and perform signal demodulation based on the distorted constellation to overcome the nonlinear impact generated in the power amplification process.

The DATA field of the TBLK is used to estimate a distorted constellation point caused by nonlinear impact generated in the power amplification process, and its modulation scheme should be the same as that of the DATA field of the BLK, that is, the valid data load part. For different modulation schemes used by the sending module 120 for the signal frame before sending the signal frame, the specific content of the DATA field of the TBLK may differ, but the constructed TBLK should ensure equiprobable distribution of all constellation points obtained by means of modulation under a corresponding modulation scheme, so as to ensure optimal overall estimation performance of distorted constellation estimation in a case of a specific training sequence length. Generally, the TBLK is always located before the BLK in the signal frame. In this way, a nonlinear suppressing module 240 can determine and demodulate a subsequent valid BLK according to the distorted constellation obtained by means of estimation, so as to eliminate the nonlinear impact generated in a power amplification process of a data signal. However, the $SFS_M$ generally appears before the TBLK, and IQ imbalance estimation and compensation can be performed for the TBLK, but the nonlinear impact generated in the power amplification process is still not eliminated in the STF, the CE and the frame header (Header) part primarily because these parts of sequences generally use BPSK modulation, which is little affected by nonlinear impact generated in the power amplification process, and may not resist the nonlinear impact generated in the power amplification process.

The sending module 120 is configured to send the physical layer signal based on the signal frame.

Figure 5:
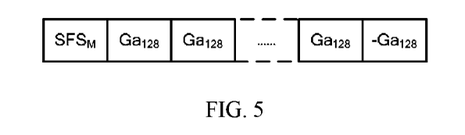
FIG. 5 is a schematic structural diagram of an STF according to an embodiment of the present invention.
Figure 7:
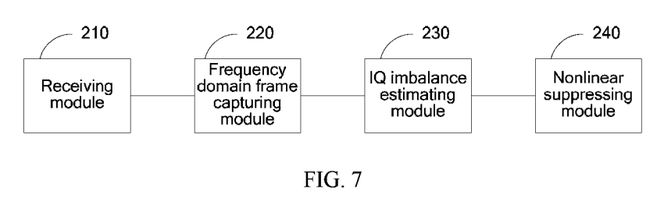
FIG. 7 is a schematic diagram of a composition structure of an apparatus for receiving a physical layer signal according to an embodiment of the present invention.

FIG. 7 is a schematic diagram of a composition structure of an apparatus for receiving a physical layer signal according to an embodiment of the present invention. As shown in FIG. 7, the apparatus for receiving a physical layer signal in this embodiment may include at least:

a receiving module 210, configured to receive a signal frame of a physical layer signal; and a frequency domain frame capturing module 220, configured to capture, if the signal frame of the physical layer signal that is received by the receiving module includes one single-frequency sequence, the signal frame in a frequency domain according to the single-frequency sequence, where the single-frequency sequence includes a plurality of single-frequency preset symbols. In this embodiment, the signal frame is captured in the frequency domain by using the single-frequency sequence $SFS_M$ shown in FIG. 5, that is, frequency domain frame capturing is performed. Because the single-frequency sequence is an impulse in the frequency domain, the apparatus 20 for receiving a physical layer signal may use the single-frequency sequence to perform frame capturing in the following manner: determining whether a frequency domain peak value of a sequence that is M in length reaches a specific threshold. If the frequency domain peak value reaches the specific threshold, it is considered that one single-frequency sequence has appeared, and it is determined that a data frame has arrived, and the frequency domain frame is captured successfully; otherwise, it is considered that no data frame has arrived. Details are expressed by the following formula:

$$\Gamma(k) = \max\{|F^{(k)}(1)|, |F^{(k)}(2)|, \ldots, |F^{(k)}(M)|\}$$

$$\begin{cases} \Gamma(k) > \eta, H_1 \\ \Gamma(k) \le \eta, H_0 \end{cases}$$

where, $\{F^{(k)}(1), F^{(k)}(2), \ldots, F^{(k)}(M)\}$ is an FFT (Fast Fourier Transform, fast Fourier transform) transformation result of a signal sequence $\{r(k+1), r(k+2), \ldots, r(k+M)\}$ received by the receiving module 210. If $H_1$ in the foregoing formula is valid, it may be determined that $\{r(k+1), r(k+2), \ldots, r(k+M)\}$ is a single-frequency sequence, and the frame is captured successfully. Research shows that a single-frequency sequence is still a single-frequency sequence after multipath crosstalk, and channel multipath leads to only fixed phase offset. Therefore, performance of the frequency domain frame capturing based on $SFS_M$ is not impaired in a case of a multipath channel. In addition, under impact of carrier frequency offset, unicity of frequency is still not affected. Therefore, different from a conventional solution, this embodiment of the present invention keeps relatively good performance of the $SFS_M$-based capturing under impact of large frequency offset.

Further, the apparatus for receiving a physical layer signal may further include:

an IQ imbalance estimating module 230, configured to perform IQ imbalance estimation according to the received single-frequency sequence. In this embodiment, phases of the symbols in the single-frequency sequence $SFS_M$ received by the receiving module 210 are increased sequentially by $\pi/2$, which may be expressed by $e^{jn\pi/2}$, n=1, 2, ..., M. The IQ imbalance estimating module 230 may acquire an IQ imbalance parameter $$\hat{\xi} = 1 - \frac{1}{1 + \sqrt{a/b}}$$

according to a signal of the received $SFS_M$ sequence by using an estimation algorithm, and phase imbalance is $$\Delta\hat{\phi} = \frac{1}{2}\arcsin\frac{c}{\sqrt{ab}},$$

where $$a = \sum_{k=D+1}^{D+2L} r_I^2[k],$$

$$b = \sum_{k=D+1}^{D+2L} r_Q^2[k],$$

and $$c = -\sum_{k=D+1}^{D+2L} r_I[k]r_Q[k].$$

-continued $$r_I[k]$$

and $$r_Q[k]$$

are an Inphase signal and a Quadrature signal, respectively, of the $SFS_M$ sequence received by the receiving module 210. Generally, the $SFS_M$ needs to be located before the BLK in the signal frame. As shown in FIG. 4, the $SFS_M$ in this embodiment is located in the first part, the STF, in the signal frame. In this way, the IQ imbalance estimating module 230 may perform IQ imbalance estimation and compensation immediately after the frequency domain frame capturing module 220 successfully captures the signal frame in the frequency domain, and the subsequent auxiliary sequence and a valid data part can be compensated. The compensation formula may be $$\begin{bmatrix} y_I[k] \\ y_Q[k] \end{bmatrix} = \frac{1}{\cos(2\Delta\hat{\phi})} \begin{bmatrix} \frac{\cos(\Delta\hat{\phi})}{1+\hat{\xi}} & \frac{\sin(\Delta\hat{\phi})}{1-\hat{\xi}} \\ \frac{\sin(\Delta\hat{\phi})}{1+\hat{\xi}} & \frac{\cos(\Delta\hat{\phi})}{1-\hat{\xi}} \end{bmatrix} \begin{bmatrix} u_I[k] \\ u_Q[k] \end{bmatrix},$$

where $\{u_I[k], u_Q[k]\}$ is a data load signal received by the receiving module 210, and $\{y_I[k], y_Q[k]\}$ is a compensated signal.

Optionally, the apparatus for receiving a physical layer signal may further include:

a nonlinear suppressing module 240, configured to suppress, according to the received training data block, nonlinear impact generated in a power amplification process. The received signal frame optionally includes a preset training data block TBLK, which has a same structure as the BLK and the structure is GI+DATA, except that the DATA in the TBLK is a known symbol and is used to estimate a distorted constellation after balancing. When the TBLK in the received signal frame is valid, the nonlinear suppressing module 240 may effectively suppress, according to the TBLK, nonlinear impact generated by the signal frame in a power amplification process. The nonlinear suppressing module 240 may specifically include the following two units:

a distortion constellation diagram estimating unit, configured to estimate a distortion constellation diagram according to the training data block; and a determining and demodulating unit, configured to use the distortion constellation diagram to determine and demodulate the physical layer signal.

Generally, the TBLK is always located before the BLK in the signal frame. In this way, the nonlinear suppressing module 240 can determine and demodulate a subsequent valid BLK according to the distorted constellation obtained by means of estimation, so as to eliminate the nonlinear impact generated in a power amplification process of a data signal. However, the $SFS_M$ generally appears before the TBLK, and IQ imbalance estimation and compensation can be performed for the TBLK, but the nonlinear impact generated in the power amplification process is still not eliminated in the STF, the CE and the frame header (Header) part primarily because these parts of sequences generally use BPSK modulation, which is little affected by nonlinear impact generated in the power amplification process, and may not resist the nonlinear impact generated in the power amplification process. In addition, when intersymbol interference exists, constellation points are disordered. The distorted constellation estimation cannot be implemented until the intersymbol interference is eliminated. Therefore, the setting of the TBLK part is similar to that of the subsequent BLK, thereby facilitating channel balancing.

Figure 8:
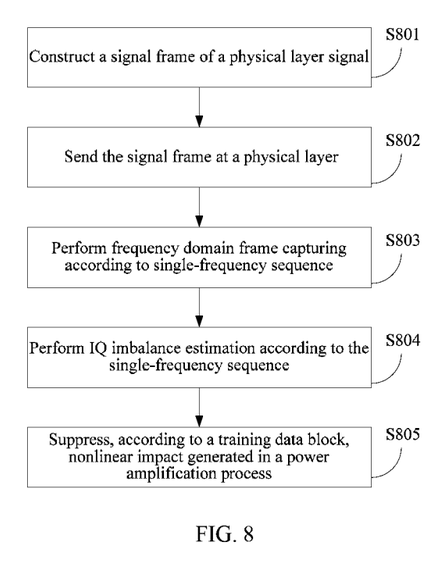
FIG. 8 is a schematic flowchart of a method for sending a physical layer signal according to an embodiment of the present invention.

FIG. 8 is a schematic flowchart of a method for sending a physical layer signal according to an embodiment of the present invention. As shown in FIG. 8, the process in this embodiment of the present invention includes the following steps:

Step S801: Construct a signal frame of a physical layer signal, where the signal frame includes one single-frequency sequence, the single-frequency sequence is used to enable a receiving apparatus to capture the signal frame in a frequency domain according to the single-frequency sequence, and the single-frequency sequence includes a plurality of single-frequency preset symbols. Specifically, the signal frame of the physical layer signal in this embodiment may be shown in FIG. 4. Under 16QAM modulation, the STF in this embodiment is formed of one single-frequency sequence $SFS_{512}$ that is 512 in length, 14 $Ga_{128}$ sequences and one $-Ga_{128}$ sequence, where the $SFS_{512}$ sequence is $e^{jn\pi/2}$, n=1, 2, . . . , 512. The single-frequency sequence $SFS_{512}$ may be used to capture a frequency domain frame and estimate an IQ imbalance parameter. The 14 $Ga_{128}$ sequences are used for frequency offset estimation and compensation, phase offset estimation and compensation, timing error estimation and compensation, and the subsequent one $-Ga_{128}$ sequence is used for frame delimitation. Both TBLK and BLK data block parts are 512 in length, and include a GI that is 64 in length and DATA that is 448 in length and has a modulation scheme 16QAM, except that the DATA in the TBLK is a preset known symbol and is used to estimate a distorted constellation after balancing. For the TBLK DATA field that is 448 in length, all constellation points under 16QAM modulation are distributed with equal probability, that is, each constellation point appears in this field for 28 times.

In the embodiment of 64QAM modulation, a difference between 64QAM modulation and the 16QAM modulation lies only in the DATA field in the TBLK. In this case, the length of the TBLK DATA is still 448 but the modulation scheme is 64QAM, and each constellation point appears for 7 times. For the embodiment of BPSK modulation, its modulation scheme determines that the nonlinear impact generated in a power amplification process is unnoticeable. Therefore, it is unnecessary to process the nonlinear impact. To improve transmission efficiency, the TBLK training data block may not be set any longer, and other parts of the signal frame are similar to those of the signal frame in the embodiments of 16QAM and 64QAM modulation.

Step S802: Send the signal frame at a physical layer.

Step S803: The receiving apparatus captures the signal frame in the frequency domain according to the single-frequency sequence $SFS_{512}$. Because the single-frequency sequence is an impulse in the frequency domain, the receiving apparatus may use the single-frequency sequence $SFS_{512}$ to capture the signal frame in the frequency domain in the following manner: determining whether a frequency domain peak value of a sequence that is 512 in length reaches a specific threshold. If the frequency domain peak value reaches the specific threshold, it is considered that a single-frequency sequence $SFS_{512}$ has appeared, and it is determined that a data frame has arrived, and the frequency domain frame is captured successfully; otherwise, it is considered that no data frame has arrived. Details are expressed by the following formula:

$$\Gamma(k) = \max\{|F^{(k)}(1)|, |F^{(k)}(2)|, \ldots, |F^{(k)}(512)|\} \quad 5$$

$$\begin{cases} \Gamma(k) > \eta, H_1 \\ \Gamma(k) \leq \eta, H_0 \end{cases}$$

where, $\{F^{(k)}(1), F^{(k)}(2), \ldots, F^{(k)}(512)\}$ is an FFT transformation result of a signal sequence $\{r(k+1), r(k+2), \ldots, r(k+512)\}$ received by the receiving module. If $H_1$ in the foregoing formula is valid, it may be determined that $\{r(k+1), r(k+2), \ldots, r(k+512)\}$ is a single-frequency sequence, and the frame is captured successfully. Research shows that a single-frequency sequence is still a single-frequency sequence after multipath crosstalk, and channel multipath leads to only fixed phase offset. Therefore, performance of the frequency domain frame capturing based on $SFS_M$ is not impaired in a case of a multipath channel. In addition, under impact of carrier frequency offset, unicity of the frequency is still not affected. Therefore, different from a conventional solution, this embodiment of the present invention keeps relatively good performance of the $SFS_{512}$-based capturing under impact of large frequency offset.

Step S804: Perform IQ imbalance estimation according to the received single-frequency sequence. In this embodiment, phases of the symbols in the single-frequency sequence $SFS_{512}$ received by the receiving apparatus are increased sequentially by $\pi/2$, which may be expressed by $e^{jn\pi/2}$, $n=1, 2, \ldots, 512$. The receiving apparatus may acquire an IQ imbalance parameter $$\hat{\xi} = 1 - \frac{2}{1 + \sqrt{a/b}}$$

according to a signal of the received $SFS_{512}$ sequence by using an estimation algorithm, and phase imbalance is $$\Delta\hat{\phi} = \frac{1}{2}\arcsin\frac{c}{\sqrt{ab}},$$

where $$a = \sum_{k=D+1}^{D+2L} r_I^2[k],$$

$$b = \sum_{k=D+1}^{D+2L} r_Q^2[k]$$

and $$c = -\sum_{k=D+1}^{D+2L} r_I[k]r_Q[k].$$

$r_I[k]$ and $r_Q[k]$ are an I signal and a Q signal, respectively, of the $SFS_{512}$ sequence received by the receiving apparatus. Generally, the $SFS_M$ needs to be located before the BLK in the signal frame. As shown in FIG. 4, the $SFS_{512}$ in this embodiment is located in the first part, the STF, in the signal frame. In this way, the receiving apparatus can perform IQ imbalance estimation and compensation immediately after the frequency domain frame is captured successfully, and the subsequent auxiliary sequence and a valid data part can get compensation. The compensation formula may be $$\begin{bmatrix} y_I[k] \\ y_Q[k] \end{bmatrix} = \frac{1}{\cos(2\Delta\hat{\phi})} \begin{bmatrix} \frac{\cos(\Delta\hat{\phi})}{1+\hat{\xi}} & \frac{\sin(\Delta\hat{\phi})}{1-\hat{\xi}} \\ \frac{\sin(\Delta\hat{\phi})}{1+\hat{\xi}} & \frac{\cos(\Delta\hat{\phi})}{1-\hat{\xi}} \end{bmatrix} \begin{bmatrix} u_I[k] \\ u_Q[k] \end{bmatrix},$$

where $\{u_I[k], u_Q[k]\}$ is a data load signal received by the receiving apparatus, and $\{y_I[k], y_Q[k]\}$ is a compensated signal.

Step S805: Suppress, according to the training data block TBLK, nonlinear impact generated in a power amplification process. The step may specifically include: estimating, by the receiving apparatus, a distortion constellation diagram according to the training data block; and using the distortion constellation diagram to determine and demodulate the physical layer signal. Generally, the TBLK is always located before the BLK in the signal frame. In this way, the receiving apparatus can determine and demodulate a subsequent valid BLK according to the distorted constellation obtained by means of estimation, so as to eliminate the nonlinear impact generated in a power amplification process of a data signal. However, the $SFS_M$ generally appears before the TBLK, and IQ imbalance estimation and compensation can be performed for the TBLK, but the nonlinear impact generated in the power amplification process is still not eliminated in the STF, the CE and the frame header part primarily because these parts of sequences generally use BPSK modulation, which is little affected by nonlinear impact generated in the power amplification process, and may not resist the nonlinear impact generated in the power amplification process.

In this embodiment of the present invention, constructing a signal frame that includes one single-frequency sequence can facilitate capturing the signal frame in a frequency domain by a receive end, and therefore, not only impact caused by frequency offset is overcome, but also multipath energy may be used effectively to improve performance of capturing. In addition, IQ imbalance estimation and compensation can be performed for a physical layer signal according to the single-frequency sequence, and the nonlinear impact generated in a power amplification process can be eliminated according to a training data block in the signal frame.

A person of ordinary skill in the art may understand that, all or a part of the processes for implementing the foregoing method embodiments may be implemented by a computer program instructing relevant hardware. The program may be stored in a computer readable storage medium. When the program is executed, the process of the embodiment of each method described above may be included. The storage medium may be a magnetic disk, an optical disc, a read-only memory (Read-Only Memory, ROM) or a random access memory (Random Access Memory, RAM), or the like.

The disclosed above are merely exemplary embodiments of the present invention, but certainly are not intended to limit the rights scope of the present invention. Any equivalent modifications made according to the claims of the present invention shall still fall within the scope of the present invention.

What is claimed is:

1. A method for a sending apparatus to send a physical layer signal, the method comprising:
    constructing, by the sending apparatus, a signal frame of the physical layer signal, wherein the signal frame comprises a single-frequency sequence, which enables a receiving apparatus to capture the signal frame in a frequency domain according to the single-frequency sequence, and the single-frequency sequence comprises a plurality of preset symbols; and wherein the signal frame comprises a preset training data block, which enables the receiving apparatus to suppress, according to the preset training data block, nonlinear impact generated in a power amplification process; and sending to the receiving apparatus, by the sending apparatus, the signal frame at a physical layer.

2. The method according to claim 1, wherein the single-frequency sequence is contained in a short training sequence part in the signal frame, which enables the receiving apparatus to perform estimation and compensation for the signal frame in a time domain and the frequency domain according to the short training sequence part.

3. The method according to claim 1, wherein before the sending the signal frame at the physical layer, the method further comprises: modulating the signal frame to a radio frequency, and all constellation points obtained through the modulation of the training data block are distributed with equal probability.

4. The method according to claim 1, wherein the training data block is located before the data block in the signal frame.

5. The method according to claim 1, wherein the single-frequency sequence is located before the training data block.

6. A method for a receiving apparatus to receive a physical layer signal, comprising:

receiving, by the receiving apparatus, a signal frame of the physical layer signal;

capturing, by the receiving apparatus, if the received signal frame of the physical layer signal comprises a single-frequency sequence, the signal frame in a frequency domain according to the single-frequency sequence, wherein the single-frequency sequence comprises a plurality of preset symbols;

wherein the signal frame comprises a preset training data block, and, after the capturing the signal frame in the frequency domain according to the single-frequency sequence, the method further comprises:

suppressing, by the receiving apparatus, according to the training data block, nonlinear impact generated in a power amplification process.

7. The method according to claim 6, wherein the single-frequency sequence is contained in a short training sequence part in the signal frame, and the short training sequence part enables the receiving apparatus to perform estimation and compensation for the signal frame in a time domain and the frequency domain.

8. The method according to claim 6, wherein phases of the preset symbols in the single-frequency sequence are increased sequentially by $\pi/2$, and, after the capturing the signal frame in the frequency domain according to the single-frequency sequence, the method further comprises:

performing Inphase and Quadrature (IQ) imbalance estimation according to the single-frequency sequence.

9. The method according to claim 6, wherein suppressing, according to the training data block, the nonlinear impact generated in the power amplification process comprises:

estimating a distortion constellation diagram according to the training data block; and determining and demodulating the physical layer signal based on the distortion constellation diagram.

10. A sending apparatus for sending a physical layer signal, comprising:

a signal frame constructing module, configured to construct a signal frame of the physical layer signal, wherein the signal frame comprises a single-frequency sequence, which enables a receiving apparatus to capture the signal frame in a frequency domain according to the single-frequency sequence, and the single-frequency sequence comprises a plurality of preset symbols; and a transmitter, configured to send the signal frame at a physical layer to the receiving apparatus;

wherein the signal frame comprises a preset training data block, which enables the receiving apparatus to suppress, according to the preset training data block, nonlinear impact generated in a power amplification process.

11. The apparatus according to claim 10, wherein the single-frequency sequence is contained in a short training sequence part in the received signal frame, and the short training sequence part enables the receiving apparatus to perform estimation and compensation for the signal frame in a time domain and the frequency domain according to the short training sequence part.

12. The apparatus according to claim 10, wherein, before sending the signal frame at the physical layer, the transmitter modulates the signal frame to a radio frequency, and all constellation points obtained through the modulation of the training data block are distributed with equal probability.

13. The apparatus according to claim 10, wherein the training data block is located before the data block in the signal frame.

14. The apparatus according to claim 1, wherein the single-frequency sequence is located before the training data block.

15. A receiving apparatus for receiving a physical layer signal, comprising:

a receiver, configured to receive a signal frame of the physical layer signal; and a frequency domain frame capturing module, configured to capture, if the signal frame of the physical layer signal that is received by the receiver comprises a single-frequency sequence, the signal frame in a frequency domain according to the single-frequency sequence, wherein the single-frequency sequence comprises a plurality of preset symbols;

wherein the signal frame further comprises a preset training data block, and the apparatus further comprises:

a nonlinear suppressing module, configured to suppress, according to the training data block, nonlinear impact generated in a power amplification process.

16. The apparatus according to claim 15, wherein the single-frequency sequence is contained in a short training sequence part in the signal frame, and the short training sequence part enables the receiving apparatus to perform estimation and compensation for the signal frame in a time domain and the frequency domain.

17. The apparatus according to claim 15, wherein phases of the symbols in the single-frequency sequence are increased sequentially by $\pi/2$, and the apparatus further comprises:

an Inphase and Quadrature (IQ) imbalance estimating module, configured to perform IQ imbalance estimation according to the single-frequency sequence.

18. The apparatus according to claim 15, wherein the nonlinear suppressing module comprises:

a distortion constellation diagram estimating unit, configured to estimate a distortion constellation diagram according to the training data block; and a determining and demodulating unit, configured to determine and demodulate the physical layer signal based on the distortion constellation diagram.

19. The apparatus according to claim 15, wherein the training data block is located before the data block in the signal frame.

20. The apparatus according to claim 15, wherein the single-frequency sequence is located before the training data block.

* * * * *